United States Patent [19]

Puel

[11] 4,047,806
[45] Sept. 13, 1977

[54] HAND HELD MICROFICHE VIEWER

[75] Inventor: Jean-Pierre Puel, Paris, France

[73] Assignee: Realist, Inc., Menomonee Falls, Wis.

[21] Appl. No.: 695,074

[22] Filed: June 11, 1976

[51] Int. Cl.² .............................................. G02B 27/02
[52] U.S. Cl. ..................................... 350/236; 350/238; 350/241
[58] Field of Search ............................. 350/236–241, 350/141, 143, 167, 259, 319, 115; 40/63 A, 64 A, 106; 240/2 AT

[56] References Cited

U.S. PATENT DOCUMENTS

| 2,845,844 | 8/1958 | Vierling | 350/141 |
| 3,039,350 | 6/1962 | Gollhofer | 350/241 |
| 3,384,436 | 5/1968 | Kunnel | 350/241 |
| 3,557,476 | 1/1971 | Kalb | 350/241 |

Primary Examiner—Paul A. Sacher
Assistant Examiner—Wm. H. Punter
Attorney, Agent, or Firm—Michael, Best & Friedrich

[57] ABSTRACT

The microfiche card has micro images arranged in horizontal rows and vertical columns. The card is inserted into the slots at the fronts of the sides of the housing and can be moved to align the desired column with the lens. The lens is vertically movable on the front of the housing and can be aligned with the desired row of images. The back of the housing has a light gathering lenticular panel which transmits light into the light chamber where it is diffused and illuminates the light diffusing (Opal) glass and the micro image. Under low ambient light conditions the switch on the handle may be depressed to illuminate the bulb in the light chamber. The handle houses the batteries which power the bulb. The focal length of the ocular is selected to provide the proper magnification of the image to make the image readable.

4 Claims, 3 Drawing Figures

HAND HELD MICROFICHE VIEWER

BACKGROUND OF THE INVENTION

Microfiche readers have been rather large devices for desk top use and incorporated projection systems so the image was projected onto a rear projection screen. With the growing use of the microfiche as a data and service tool there has been an increasing need for more portable readers usable in the field. The present invention is directed to provision of a portable reader which a serviceman can take to the job.

PRIOR ART

The hand held microfiche readers now on the market sacrifice ease of use and performance in adverse light conditions in the interest of minimal size.

SUMMARY OF THE INVENTION

With the construction described above I have provided an extremely portable reader which is easily employed on the job by a repairman. Means are provided for transporting and holding the fiche horizontally and the lens is frictionally carried on the lensboard track so once adjusted the fiche and lens will stay in position permitting repeated reference to the image during the course of the service. The reader is very compact and yet very durable.

DESCRIPTION OF THE PREFERRED EMBODIMENT

Figure 1:
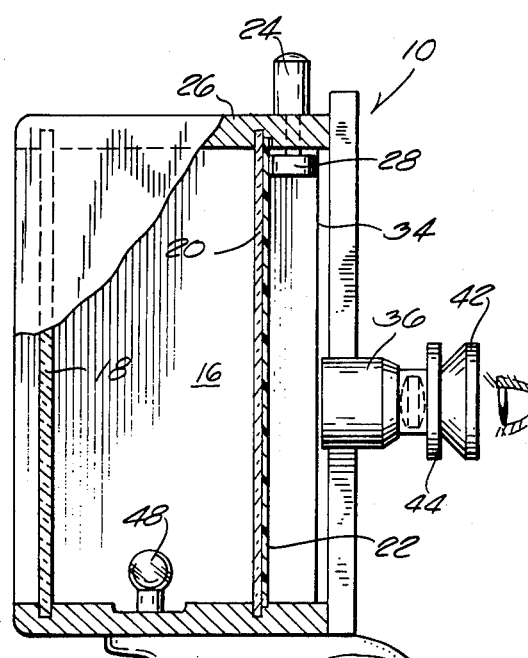
FIG. 1 is a side elevation of the microfiche reader with some parts broken away to show details of the construction.
Figure 2:
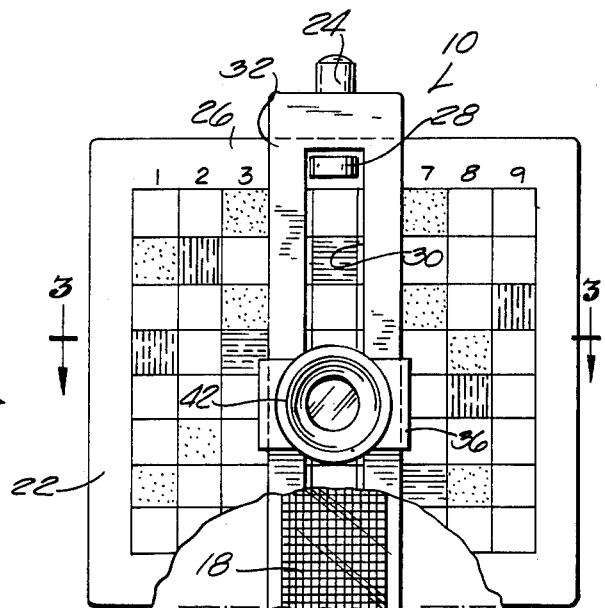
FIG. 2 is a front elevation of the reader with parts broken away to show the lenticular panel.
Figure 3:
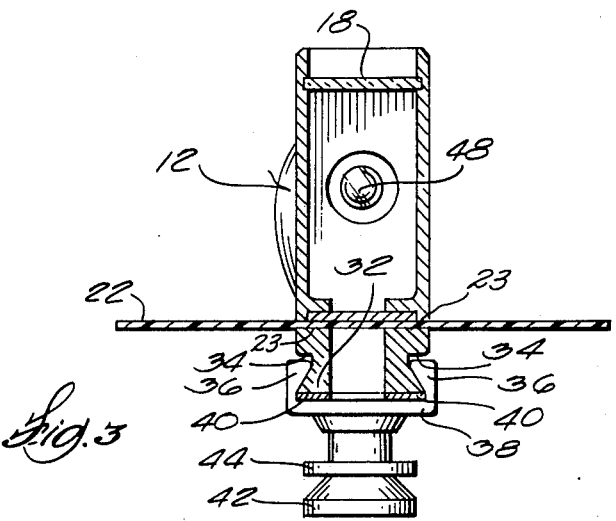
FIG. 3 is a horizontal section on line 3—3 of FIG. 2.

The microfiche reader has a housing 10 provided with a pistol grip handle 12 mounted on the bottom of the housing and providing a chamber 13 for batteries 14. The housing 10 has an interior light chamber 16 illuminated from the back of the housing by a lenticular light gathering panel 18 which has a series of small lenses embossed on the exterior face to gather ambient light from a wide angle and transmit that light into the light chamber where it is diffused by light diffusing glass 20 and evenly transmitted to a through the microfiche 22. Slots 23 are provided on each side of the housing near the front and ahead of the light diffusing glass 20 to permit insertion of the microfiche 22. A fiche advancing knob 24 is rotatably mounted in the top 26 of the housing to rotate the resilient wheel 28 which presses the fiche against the glass so that when the knob 24 is rotated the fiche may be advanced in one direction or the other to align the proper column with the vertical window 30 in the front panel 32 of the housing 10. Each side of the front panel is provided with a generally V-shaped notch 34 to receive the cooperating fingers 36,36 projecting rearwardly from the lensboard 38. Suitable friction material 40 is provided on the inside or back of the lensboard to bear against the surface of panel 32 so as to retain the lensboard in any vertical position. This arrangement permits the lensboard to slide up and down on the front of the housing 10. The lensboard supports the viewing lens 42 and the lens is provided with a focusing wheel 44. The viewing lens is known as an ocular and provides a magnified virtual image.

With this arrangement the fiche can be moved horizontally to align the proper column with the window 30 and then the lensboard is moved vertically on the front panel to align the lens with the proper row. The user holds the viewer facing the brightest light source and can read the details of the selected micro image. If desired, the front panel can be provided with indicia aiding in setting the vertical position of the lensboard and the window can be arranged so as to permit direct viewing of the columns indicated on the fiche in use.

If there is inadequate ambient light to properly illuminate the micro image, the switch 46 on the grip 12 can be depressed to energize bulb 48 at the bottom of the light chamber.

This arrangement provides an extremely portable and low cost reader which can be taken into the field for use. It is not visualized that this would replace the more traditional larger readers which are designed for heavy daily use. This portable reader permits the use of microfiche information in the field and increases the use of the microfiche.

I claim:

1. A microfiche reader comprising a housing having a rectangular lenticular light gathering panel at the rear of the housing to gather ambient light and transmit it to the interior of the housing, the long dimension of the panel being vertical,
   the front of said housing having a vertically elongated aperture therein,
   a rectangular light diffusing glass panel mounted in the interior of the housing in the proximity of the front of the housing adjacent the aperture and parallel to the light gathering panel,
   a slot in each side of the housing immediately ahead of the light diffusing glass and dimensioned to receive and guide a microfiche card for movement transversely to the housing and of said aperture so as to position any desired column of images on the card in alignment with said aperture while confining the card around the perimeter of the aperture to hold the card flat,
   a lensboard movably mounted on the front panel,
   a viewing lens mounted on the lensboard in alignment with said aperture and positionable in alignment with any desired row of a microfiche card positioned in said slots.

2. A microfiche reader according to claim 1 including means for manually advancing the microfiche and retaining the microfiche in any desired position relative to the housing.

3. A microfiche reader according to claim 2 including friction means for retaining the lensboard in any of its adjusted positions.

4. A microfiche reader according to claim 3 including handle means mounted on the housing, a battery chamber within the handle means, batteries in the chamber, a lamp bulb in the interior of the housing and wired for connection of the batteries, and switch means for controlling energization of the lamp bulb.

* * * * *